United States Patent [19]

Flament

[11] 4,247,571
[45] Jan. 27, 1981

[54] 3-METHYL-1,2,4-TRITHIANE AS A FLAVORING INGREDIENT

[75] Inventor: Ivon Flament, Petit-Lancy, Switzerland

[73] Assignee: Firmenich SA, Geneva, Switzerland

[21] Appl. No.: 963,127

[22] Filed: Nov. 22, 1978

[30] Foreign Application Priority Data

Dec. 6, 1977 [CH] Switzerland ..................... 14890/77

[51] Int. Cl.³ .............................................. A23L 1/226
[52] U.S. Cl. .................................................... 426/535
[58] Field of Search ......................................... 426/535

[56] References Cited

U.S. PATENT DOCUMENTS

| B 560,717 | 2/1976 | Wilson et al. .................. 426/535 |
| 3,503,758 | 3/1970 | Wada et al. ................... 426/535 |
| 3,863,013 | 1/1975 | Wilson et al. .................. 426/535 |
| 4,031,257 | 6/1977 | Wilson et al. .................. 426/535 |

OTHER PUBLICATIONS

Chemical Abstracts, 85:107665c (1976).

*Primary Examiner*—Joseph M. Golian
*Attorney, Agent, or Firm*—Pennie & Edmonds

[57] ABSTRACT

Use of 3-methyl-1,2,4-trithiane as flavoring and taste-modifying agent in the aromatization of foodstuffs in general and imitation flavors for foodstuffs, animal feeds, pharmaceutical preparations and tobacco products.

4 Claims, No Drawings

3-METHYL-1,2,4-TRITHIANE AS A FLAVORING INGREDIENT

SUMMARY OF THE INVENTION

The present invention relates to the use of 3-methyl-1,2,4-trithiane, a sulfur containing heterocyclic compound of formula

as flavouring and taste modifying agent. In particular this invention provides a method for the aromatization of foodstuffs, animal feeds, beverages, pharmaceutical preparations and tobacco products which process comprises adding thereto a small but flavouring effective amount of 3-methyl-1,2,4-trithiane. Another object of the present invention is to provide a flavouring composition which comprises as active ingredient 3-methyl-1,2,4-trithiane.

A further object of this invention is to provide a foodstuff, a beverage, a pharmaceutical preparation or a tobacco product which comprises having added thereto a small but flavouring effective amount of 3-methyl-1,2,4-trithiane.

Particularly it has now been found that a meaty flavour can be enhanced or imparted to a foodstuff which contains meat or a meat simulating product by the incorporation of 3-methyl-1,2,4-trithiane. Accordingly, the present invention provides a foodstuff comprising a meat product or a meat simulating product and 3-methyl-1,2,4-trithiane.

BACKGROUND OF THE INVENTION

One of the main objects of the aromatization of foodstuffs for instance is to restore the original quality and nature of the flavour, aroma and taste of a given foodstuff material. Very often in fact the organoleptic properties of foodstuffs particularly diminish or are somehow modified in the course of the processes of freezing and storage, or during the modifications, such as cooking or baking, to which the foodstuffs are subjected in order to yield an edible material.

In the past the aromatization was mainly achieved by using materials of natural origin. Nowadays, however, synthetic chemical compounds are used at an ever increasing rate. Said compounds possess the advantage of being available very often in unlimited quantities and at prices lower than those of the natural materials. Moreover, due to the fact that the flavouring character of a natural material is the result of the overall effect determined by the combination and interaction of each of its constituents, the effects achieved by said natural material are very often not as well reproducible as those obtained by the use of the pure synthetic compounds.

As a consequence, the problem that the chemical industry has to solve is to satisfy the increasing demand of organoleptically interesting chemicals in order to better suit the specific needs of the flavourists.

Numerous investigations have been carried out in the past by several research teams in view to reproduce the typical gustative characters of meaty or meat-imitating foodstuffs.

This problem however is of a particularly complex nature and for the time being its solution is only partially provided for. Both scientific and patents literature report on several sulfur containing heterocyclic derivatives, more particularly on polysulfur compounds.

3,5-Dimethyl-1,2,4-trithiolane has been described as being a constituent of boiled beef [Chemistry and Industry 1639 (1968)] and polyalkyltrithianes have been described as compounds possessing a powerful putrid smell [U.S. Pat. No. 2,594,379].

Franz Ledl [see Z. Lebensm. Unters. Forsch. 161, 125–129 (1976)] describes the presence of 3-methyl-1,2,4-trithiane in a complex mixture obtained by thermal treatment of cysteine, cystine and N-acetyl-cystein, for example, in soya oil at 200° C. No indication however has been given by the author concerning the flavouring properties of the compound in question, nor any suggestion has been formulated with regard to its possible use as flavour ingredient.

Finally, Swiss Pat. No. 562,572 discloses several synthetic polyalkylated trithianes of formula

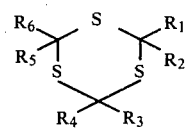

wherein $R_1$, $R_3$ and $R_5$ represent an identical alkyl radical having 1 to 5 carbon atoms and $R_2$, $R_4$ and $R_6$ represent an identical alkyl radical having 1 to 5 carbon atoms or hydrogen atoms. These compounds possess a sweet flavour or taste reminiscent of nuts and can be utilized for the preparation of fruity flavours, (red-currant, black-currant, grape and raspberry), as well as nut and meat flavours.

PREFERRED EMBODIMENTS OF THE INVENTION

We have now discovered that by using 3-methyl-1,2,4-trithiane in accordance with the invention, it was possible to reconstitute in a more faithful manner the natural flavour of certain foodstuffs, meat in particular. The organoleptic characters of 3-methyl-1,2,4-trithiane are at the same time of roasted, fatty, meaty, burnt and grilled type. The compound is moreover of a remarkable flavouring strength.

Due to its properties, 3-methyl-1,2,4-trithiane can find a wide range of applications and be utilized for the aromatization of foodstuffs as varied as cocoa, chocolate, cereals, coffee and meat, in which foodstuffs it develops greatly appreciated roasted and grilled notes. 3-Methyl-1,2,4-trithiane can be used in the flavour industry on its own, or in compositions comprising one or more flavouring coingredients in diluted or concentrated solution in the solvents currently used in the art such as e.g. ethyl alcohol, triacetine or diethyleneglycol.

As indicated above, 3-methyl-1,2,4-trithiane is an extremely powerful flavour ingredient and consequently very minute proportions of it in a composition can achieve satisfactory results. Thus, in the direct aromatization of foodstuffs amounts of the order of about 0.05 to 0.5 ppm (parts per million) by weight of 3-methyl-1,2,4-trithiane based on the total weight of the flavoured foodstuff, were generally found as sufficient.

Preferred proportions were of from about 0.05 to 0.150 ppm.

In all cases, the ranges mentioned above may be varied, in order to achieve specific organoleptic effects. The man skilled in the art will appreciate anyhow that these proportions depend on the nature of the other constituents of a given composition or on that of the products to which the ingredient of the invention is added.

3-Methyl-1,2,4-trithiane can be synthetized according to the method described in Z. Lebensm. Unters. Forsch. 161, 125–129 (1976). Alternatively, its preparation can be achieved in accordance to the process illustrated hereinbelow:

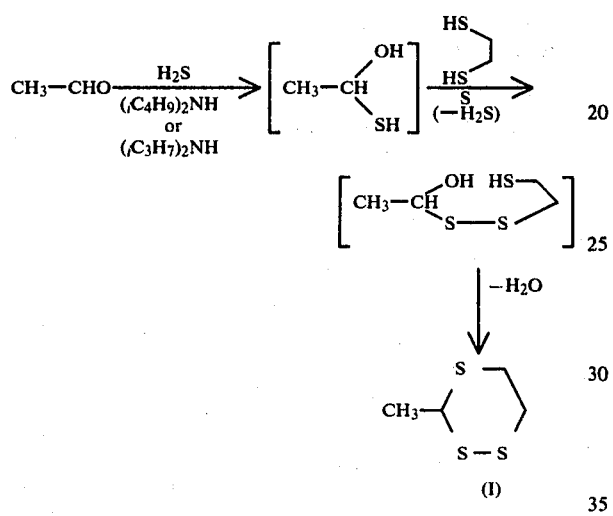

This process is described in more detailed manner as follows:

100 g (1 Mole) of diisopropylamine cooled at 0° were saturated with a slow stream of H₂S (6 h). 36.3 g (0.8 Mole) of acetaldehyde were then added within 15 minutes to the obtained semi-crystalline mass while the colour appearing yellowish at the beginning of the reaction becomes pinkish at the end of the addition.

Stirring was carried on for 60 minutes while keeping the temperature of the reaction mixture at about 10° C., whereupon 77.5 g (0.8 Mole) of 1,2-ethanedithiol were added thereto at a temperature of between about 10° to 15° C. After 10 additional minutes stirring, 26.4 g (0.8 at-gr) of sulfur were added to the mixture while stirring was continued for 5 more hours. After acidification with concentrated aqueous HCl to pH 2–3, the mixture was extracted with five fractions of 150 ml each of ether. The raw material was first distilled at reduced pressure (B.p. up to 70° C./$10^{-3}$ Torr) in order to avoid the formation of polymeric gums, then trithiane was collected by fractional distillation at b.p. 55° C./10 Torr. 3.2 g of pure product were thus obtained. The analytical data of this product were identical with those presented by a sample obtained in accordance with the previous known described method. The invention is better illustrated by but not limited to the following examples.

EXAMPLE 1

An organoleptic evaluation of 3-methyl-1,2,4-trithiane was carried out by dissolving it in a 0.5% solution of NaCl in water in a proportion of 0.15 ppm. The obtained solution possessed a pronounced roasted meaty and fatty taste.

EXAMPLE 2

2.8 g of commercial instant coffee powder were dissolved in 200 ml of boiling water. 30 ml of the thus obtained coffee beverage were then poured into separate cups, and to half of them 3-methyl-1,2,4-trithiane was added in a proportion of 0.05 ppm.

When compared with the unflavoured coffee beverage, the taste and the aroma of the flavoured beverage was judged by a panel of experts as possessing a burnt character and a pronouced note of roasted beans.

EXAMPLE 3

A base flavouring composition of "praline" type was prepared by admixing the following ingredients (parts by weight):

| | |
|---|---|
| hazelnuts | 50 |
| peanuts | 5 |
| sugar | 45 |
| | 100 |

By adding to 50 g of the above base 0.05 ppm of 3-methyl-1,2,4-trithiane, there was obtained a novel composition possessing an enhanced "praline" character when compared with the unflavoured base. The novel composition possessed moreover a more roasted and rounded taste then the base composition.

EXAMPLE 4

A flavouring composition imitating beef broth was prepared by dissolving the following ingredients in water (parts by weight):

| | |
|---|---|
| Commercial beef gravy | 100 |
| Monosodium glutamate | 10 |
| Sodium 5-inositate and sodium guanilate (50:50) | 0.05 |
| Sodium chloride | 80 |
| Lactic acid | 5 |

Water was added up to a total volume of 10 lt.

To 1 lt of the above broth there were added 0.075 ppm of 3-methyl-1,2,4-trithiane. There was thus obtained a "test" foodstuff. This was evaluated by a panel of experts who declared that its taste was more meaty and possessed a more roasted character than the unflavoured broth.

EXAMPLE 5

A commercial sample of liver pâté was aromatized by means of 0.075 ppm of 3-methyl-1,2,4-trithiane. The thus flavoured foodstuff possessed a more pronounced and natural meaty character than the unflavoured pâté. The flavoured product showed moreover a grilled liver note.

EXAMPLE 6

A base for the preparation of hamburgers was obtained by mixing together 70 g of beef meat, 29 g of bread-crumbs and 1 g of salt. Two samples of this base were flavoured before cooking with 0.075 ppm (sample A) and 0.150 ppm (sample B) of 3-methyl-1,2,4-trithiane.

Sample A possessed an enhanced and more rounded flavour when compared with the unflavoured base.

Sample B showed a more juicy taste and a more pronounced character of fresh meat while it developed a strong roasted after-taste.

What I claim is:

1. A method for the aromatization of foodstuffs, animal feeds, and beverages, which method comprises adding a small but flavoring effective amount of 3-methyl-1,2,4-trithiane to impart a roasted and grilled note thereto.

2. A foodstuff or a beverage which comprises having added thereto a small but flavoring effective amount of 3-methyl-1,2,4-trithiane to impart a roasted and grilled note to said foodstuff or beverage.

3. A foodstuff comprising a meat or a meat-simulating product and a small but flavoring effective amount of 3-methyl-1,2,4-trithiane to impart a grilled and roasted note thereto.

4. A foodstuff comprising a coffee or a coffee-simulating product and a small but flavoring effective amount of 3-methyl-1,2,4-trithiane to impart a burnt and roasted note thereto.

* * * * *